Figure 1:
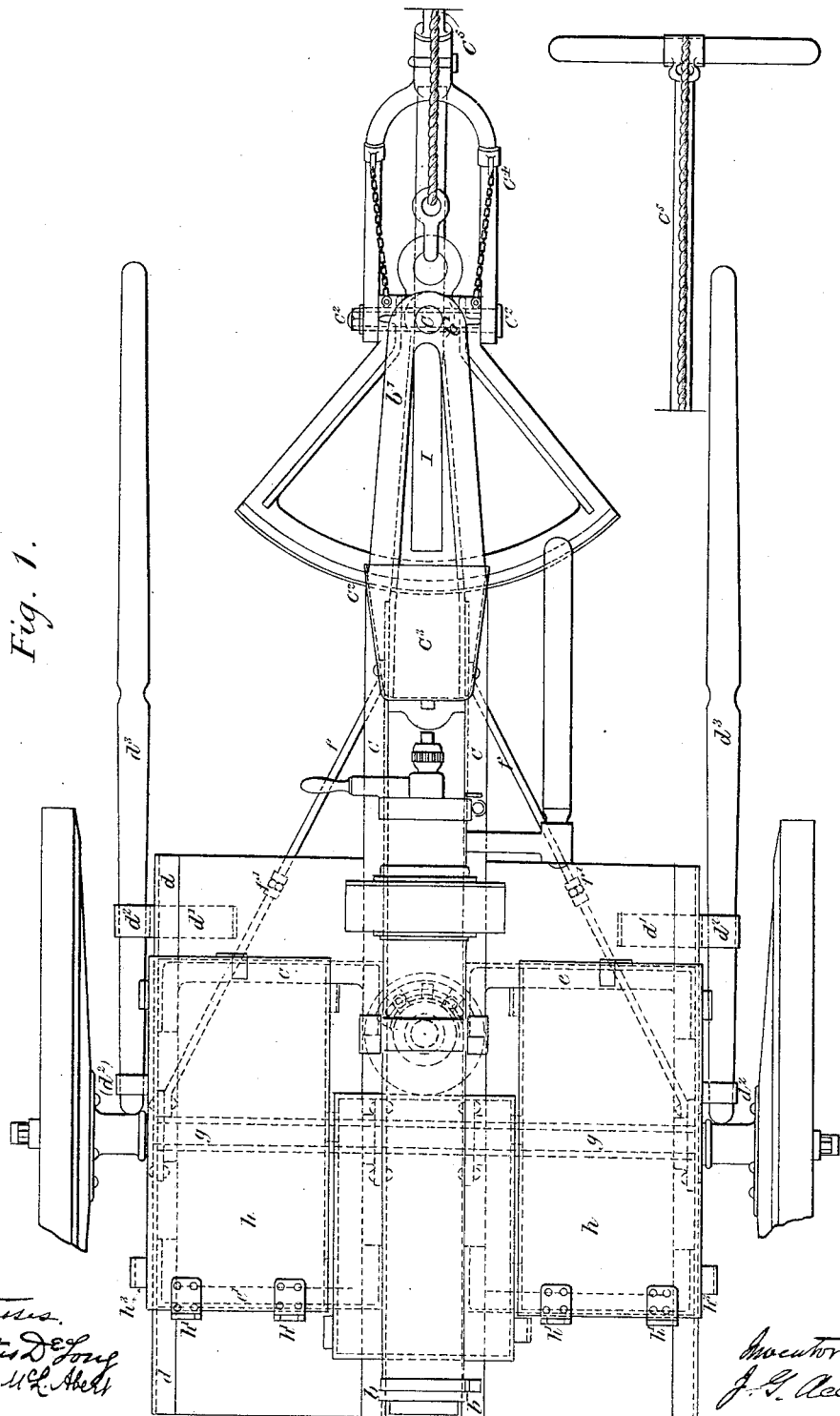

(No Model.)

6 Sheets—Sheet 1.

J. G. ACCLES.
CARRIAGE FOR MACHINE GUNS.

No. 348,180. Patented Aug. 31, 1886.

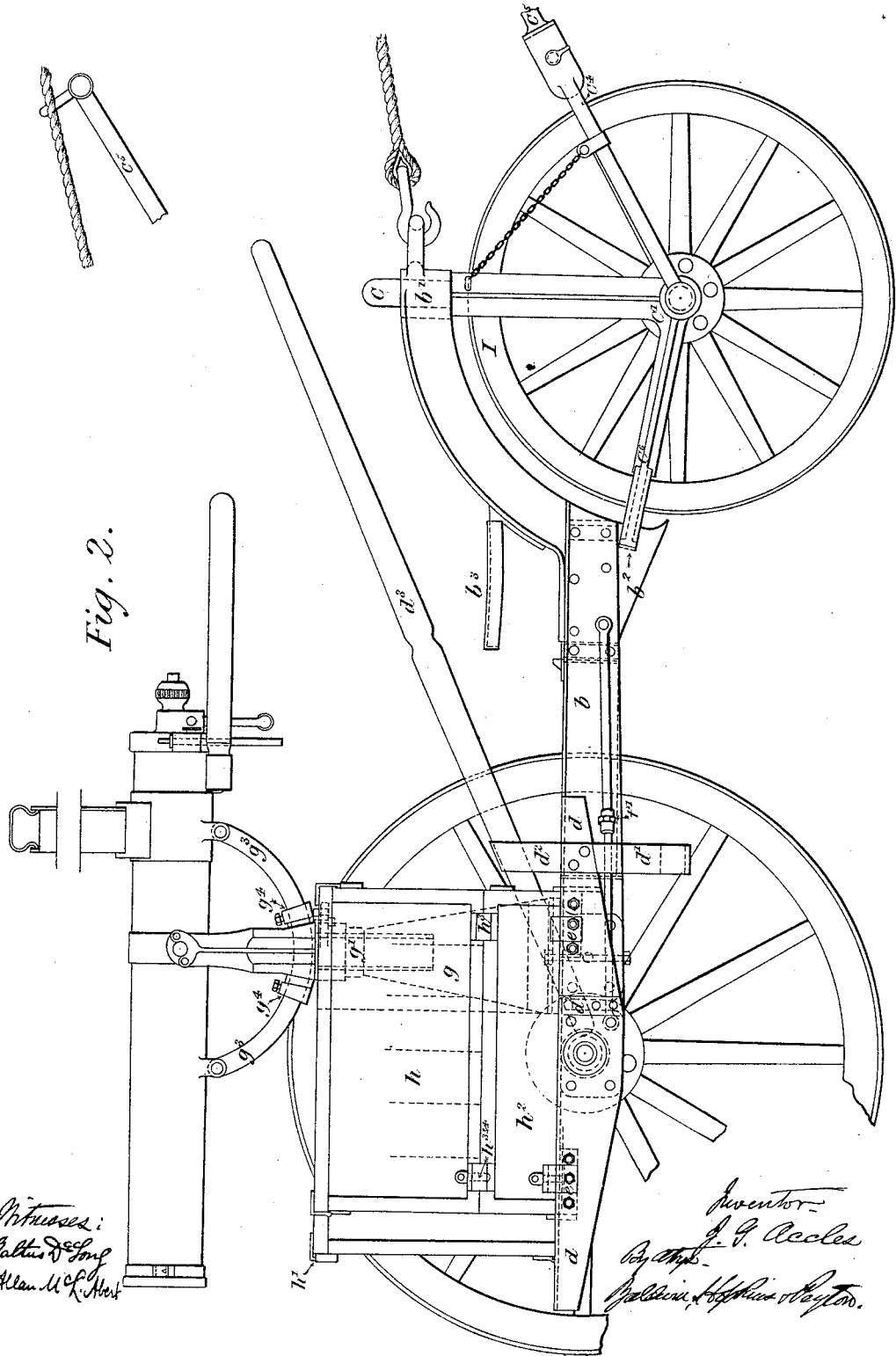

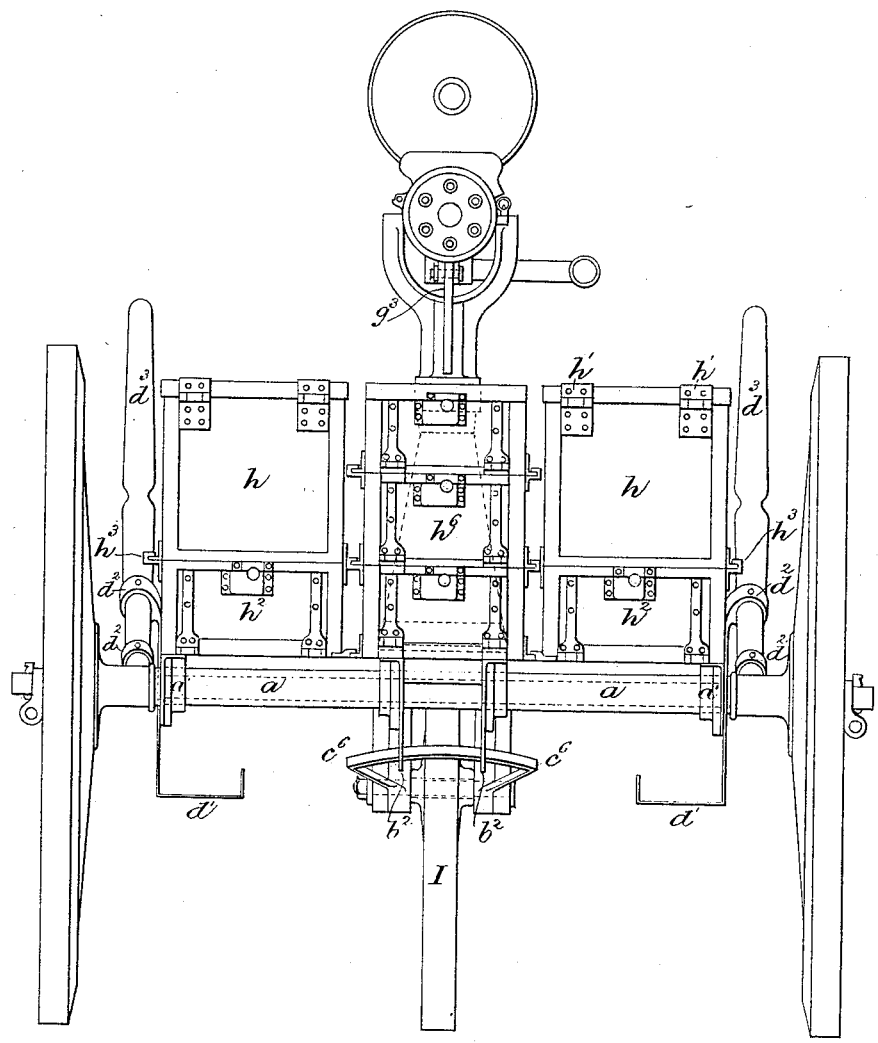

(No Model.) 6 Sheets—Sheet 4.
J. G. ACCLES.
CARRIAGE FOR MACHINE GUNS.
No. 348,180. Patented Aug. 31, 1886.
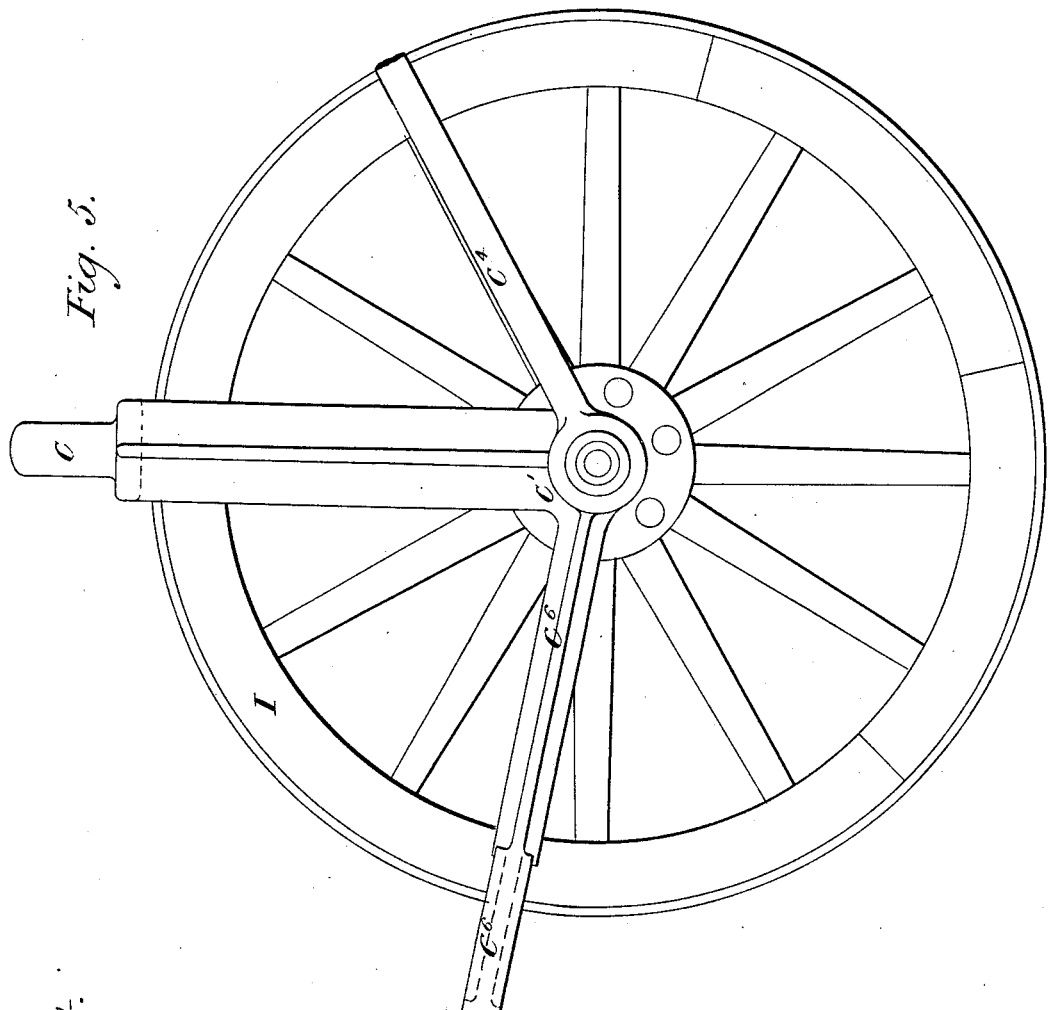
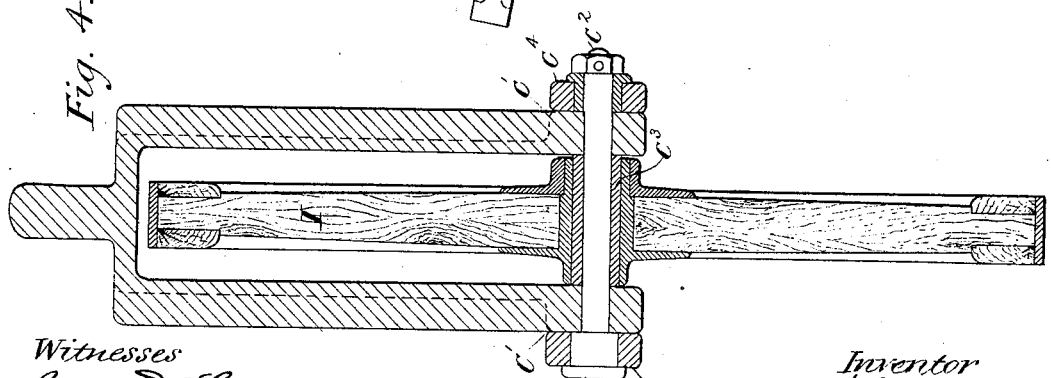
N. PETERS, Photo-Lithographer, Washington, D. C.

(No Model.)  6 Sheets—Sheet 5.

J. G. ACCLES.
CARRIAGE FOR MACHINE GUNS.

No. 348,180.  Patented Aug. 31, 1886.

Witnesses  
Baltus D. Long  
Allan McLane Abert

Inventor  
J. G. Accles (No Model.)  
J. G. ACCLES.  
CARRIAGE FOR MACHINE GUNS.

No. 348,180.

6 Sheets—Sheet 6.

Patented Aug. 31, 1886.

United States Patent Office.

JAMES GEORGE ACCLES, OF HARTFORD, CONNECTICUT.

CARRIAGE FOR MACHINE-GUNS.

SPECIFICATION forming part of Letters Patent No. 348,180, dated August 31, 1886.

Application filed February 10, 1886. Serial No. 191,460. (No model.)

*To all whom it may concern:*

Be it known that I, JAMES GEORGE ACCLES, a citizen of the United States of America, and a resident of Hartford, Connecticut, but at present residing at Newcastle-upon-Tyne, in the county of Northumberland, England, engineer, have invented an Improved Carriage for Machine-Guns, of which the following is a specification.

This invention has for its object an improved carriage for a machine-gun of the well-known Gatling type. The body of the carriage is supported in front upon a crank-axle with a pair of wheels. It is provided with a trail projecting to the rear. The trail is curved upward at its end, and terminates in a socket. The socket receives a spindle, which is forked at its lower end and carries a small steering-wheel. A handle is jointed to this fork, by means of which the carriage is steered and drawn from place to place. The trail is further supported upon an arc projecting forward horizontally from the fork of the steering-wheel and entering a guide-groove beneath the trail. The gun is carried upon a pedestal centrally placed upon the carriage-body immediately in rear of the axle. At the top of the pedestal there is a socket receiving the stem of a fork, in which the trunnions of the gun are received. There are adjustable stops on the top of the socket to limit in a horizontal plane the motion of the gun while in action, so that more of less spreading of the fire may be obtained, as may be desired. A curved arc is also connected beneath the gun concentric with the trunnions, and this carries stops which can be clipped upon it in any desired position to limit the movement of the gun in a vertical plane. By the sides of the pedestal are metal cases for containing the ammunition and the feeders in which the ammunition is arranged for the supply of the gun. There are two cases on either side, one standing on the other. The upper case carries the feeders ready charged, and the other or under case carries spare ammunition in packages. The two cases are made to lock together, the upper one onto the lower, and the latter is secured to the carriage by lugs on its under side and a spring-bolt entering one of these lugs. In front of the gun, also underneath the muzzle, there are two or more ammunition-cases standing one on the other, and the lower one is secured to the carriage in the manner already described. The ammunition is divided in this manner for more convenient transport upon pack-mules. Two of the cases form a load. The carriage is provided with tracking ropes, by which it is drawn while retiring, and wooden poles are provided, one on each side, which enter sockets upon the carriage. By these the carriage is propelled by men when advancing in action. The same poles can be fitted into sockets, one on either side of the steering-handle, and these then serve as shafts, and a mule can be harnessed between them to aid in moving the carriage. For traveling long distances and carrying a large amount of ammunition the small steering-wheel is replaced by a limber-carriage, which receives the end of the trail, as this is usually carried in field-guns. The seat for the man who works the gun in action is upon the trail. It is jointed to the rising part at its rear end, so that it can be raised up out of the way when not in use. Beneath the body of the carriage there are two stirrup-like foot-rests, by which the man steadies himself, so that he is able to work the gun conveniently and efficiently while it is in movement. The gun is controlled by a stock-lever passing under the arm of the operator. By this he can direct the gun while looking along the sights and firing. The gun thus mounted can fire both advancing and during retreat—a feature of very great importance.

In order that my said invention may be most fully understood and readily carried into effect, I will proceed to describe the drawings hereunto annexed.

Figure 7:
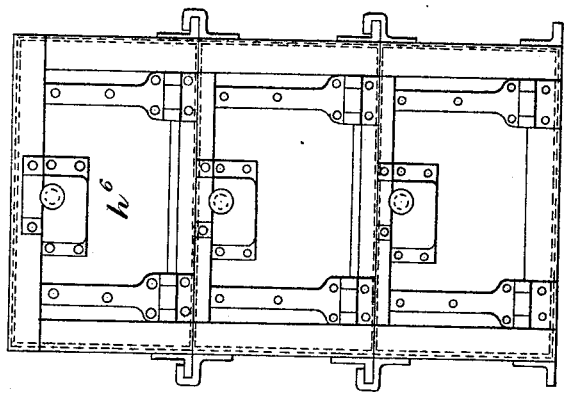
Figure 6:
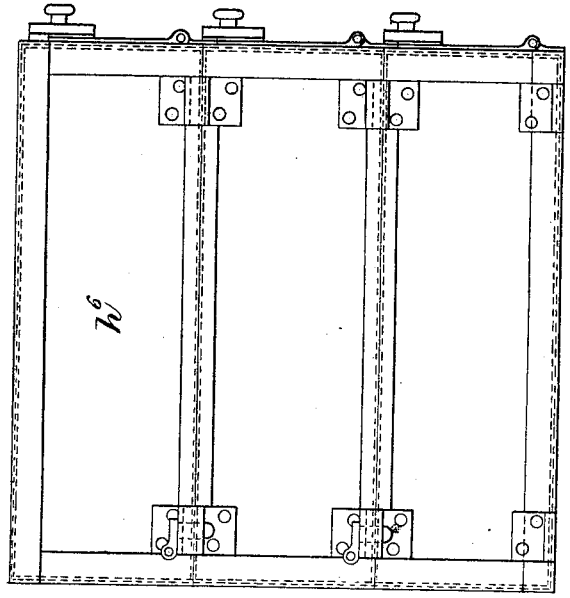
Figure 8:
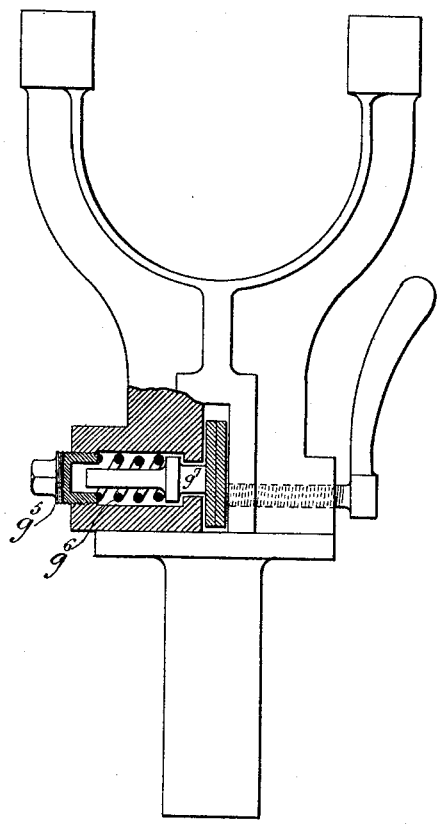

In the drawings, Figure 1 is a plan of the carriage complete with the two pushing-poles in position. Fig. 2 is a side elevation of the same. Fig. 3 is a front elevation of the same. Fig. 4 is a vertical section of the steering-wheel, showing the center bolt and bush or cylinder. Fig. 5 is a side elevation of the steering-wheel, showing the horizontal arc. Fig. 6 is a side, and Fig. 7 a rear, elevation of the ammunition-cases. Fig. 8 is an elevation, partly in section, of the gun fork or mount, showing a detail in connection therewith.

The body of the carriage is supported in the front part upon an axle, $a$, with a pair of main supporting-wheels. Two pieces of angle iron or steel, which form the trail $b$, are joined to the axle $a$, near the center, a short distance apart, and projecting forward and to the rear. The rear end of the trail $b$ is curved, and terminates in a socket, $b'$. The socket $b'$ receives a spindle, $c$, which is forked at its lower end, $c'$. Between the fork is placed the steering-wheel I, which is kept in its place by a pin or bolt, $c^2$. On this pin or bolt $c^2$, between the sides of the fork $c'$, is placed a bush or cylinder, $c^3$, on which runs the steering-wheel. The object of this bush or cylinder is to keep the sides of the fork $c'$ the proper distance apart, and when the bolt $c^2$ is screwed up tight, to keep the fork $c'$ rigid and prevent the sides of the fork $c'$ from closing in against the hub of the steering-wheel. The center bolt, $c^2$, is left long enough to take the fork $c^4$, in which is fitted the steering and drag handle $c^5$ or shafts. Projecting forward from the lower end of the fork $c'$ is a horizontal arc, $c^6$, which runs in guide-grooves beneath the rear end of the trail $b^2$. The object of the arc $c^6$ is to help support the trail $b'$ and prevent the spindle $c$ from bending or breaking when striking against any object when the carriage is moving. A seat, $b^3$, for the man who fires the gun is fitted to the rising part of the trail $b'$ at the rear, so arranged that it can be turned up out of the way when not in use. At each side of the trail $b$, joined to the axle $a'$ near the wheels, are two angle iron or steel side pieces, $d$. Stays $e$ are carried from the trail $b$ to the side pieces, $d$, and held in their places with screw-bolts. The remaining space between the trail $b$ and the side pieces, $d$, is filled up with wood.

To strengthen the carriage two stays, $f$, reach from the rear end of the trail $b^2$ to the ends of the axle $a$. Near the center of the stays $f$ are right and left hand threaded nuts $f'$, by means of which all slackness in the carriage can be taken up. On each side of the side pieces, $d$, at the rear, projecting downward and bent under the carriage, are fitted two stirrups, $d'$, or foot-rests, by which the man steadies himself, so that he is able to work the gun conveniently and efficiently while it is in movement. The metal which forms the stirrups $d'$ is carried upward and terminates in eyes or sockets $d^2$, in which and in the sockets $d^2$, close to the axle, two separate or unconnected poles, $d^3$, are placed pointing to the rear. The object of these two poles $d^3$ is to provide means by which the gun and carriage can be advanced into action from the rear by men pushing against the aforesaid poles $d^3$, and without having men in front of the gun or carriage. These two poles $d^3$ can be detached from their sockets and be fitted into sockets one on each end of the cross-bar of the drag-handle $c^5$, and so form a pair of shafts for a mule. The gun is carried upon a pedestal, $g$, placed upon the trail $b$, immediately in rear of the axle $a$. At the top of the pedestal $g$ is a socket, $g'$, into which is fitted the stem of the fork or gun-mount $g^2$, in which the trunnions of the gun are carried. There are adjustable stops on the top of the socket $g'$. A curved arc, $g^3$, is also connected beneath the gun concentric with the trunnions, on which are two stops, $g^4$, which can be set at any desired position. On the side of the fork or mount where the elevating-arc $g^3$ passes through the lower part there is fitted a set-nut or screw-plug, $g^5$, spring $g^6$, and pin $g^7$. The object of this arrangement is to prevent the gun from moving too freely by producing a friction on the elevating-arc, against which the pin bears with spring-pressure. On each side of the pedestal $g$ are metal cases $h$, containing ammunition, and the feeders in which ammunition is carried for immediate supply to the gun. The cover of the upper case is hinged at the front end, $h'$, so when open at right angles to the top of the case $h$ it forms a shield to protect the men working the gun in action. The two cases $h$ and $h^2$ are locked together by means of lugs $h^3$ on the under side of the upper case, $h$, which enter cleats on the top or sides of the lower case, $h^2$, and are prevented from moving out by means of a pin or bolt passing through the lug $h^3$ and cleat. The lower case, $h^2$, is held on the carriage by lugs passing under cleats, and prevented from moving by means of a spring bolt or pin passing through the cleats and lugs, in the same manner as already described. In front of the pedestal $g$, under the muzzle of the gun, are three metal ammunition-cases, $h^6$, one on the other, and secured together and held on the carriage in the manner already described.

When firing the gun while the carriage is advancing or retiring, the man who works the gun rides on the seat $b^3$ at the rear end of the trail $b'$, and steadies himself with his feet in the stirrups $d'$.

Having now particularly described and ascertained the nature of my said invention, and in what manner the same is to be performed, I would have it understood that what I claim is—

1. The combination, in a machine-gun carriage, of the main supporting wheels and axle, the trail bent upwardly at rear, the forked spindle engaged thereby, the steering-wheel, the horizontally-extending arc connected at its rear with the spindle, and the guide-groove for the front end of the arc beneath the trail, substantially as and for the purpose set forth.

2. The combination, in a machine-gun carriage, of the gun-pedestal, the forked gun-mount fitted in the socket thereof, the gun, the elevating-arc passing through the mount, the stops $g^4$ on the arc, the pin bearing against the arc and fitted in the gun-mount, and the spring acting on the pin, substantially as and for the purpose set forth.

JAMES GEORGE ACCLES.

Witnesses:
E. CLARK,
Solr., County Chambers, Newcastle-upon-Tyne.
WM. BOWES PYLE,
His Clerk.